(12) United States Patent
Williams

(10) Patent No.: US 10,065,227 B2
(45) Date of Patent: Sep. 4, 2018

(54) CONDUIT TUBE BENDING TESTER

(71) Applicant: Bryan Williams, Kingsport, TN (US)

(72) Inventor: Bryan Williams, Kingsport, TN (US)

( * ) Notice: Subject to any disclaimer, the term of this patent is extended or adjusted under 35 U.S.C. 154(b) by 147 days.

(21) Appl. No.: 15/247,020

(22) Filed: Aug. 25, 2016

(65) Prior Publication Data

US 2018/0056360 A1    Mar. 1, 2018

(51) Int. Cl.
*B21D 7/14* (2006.01)
*F16L 1/10* (2006.01)

(52) U.S. Cl.
CPC . *B21D 7/14* (2013.01); *F16L 1/10* (2013.01)

(58) Field of Classification Search
CPC ................ B21D 7/14; B21D 9/03; F16L 1/10
USPC .......................................................... 33/529
See application file for complete search history.

(56) References Cited

U.S. PATENT DOCUMENTS

| 456,271 | A |   | 7/1891 | Herrick |   |
|---|---|---|---|---|---|
| 1,520,143 | A | * | 12/1924 | Sandell | B21D 7/00 33/529 |
| 2,066,473 | A |   | 1/1937 | Enoch |   |
| 2,321,064 | A |   | 6/1943 | Broedling |   |
| 2,679,693 | A | * | 6/1954 | Maes | F16L 1/10 33/529 |
| 4,648,733 | A | * | 3/1987 | Merkt | F16L 11/18 138/120 |
| 4,696,136 | A |   | 9/1987 | Grewe |   |
| 4,807,370 | A | * | 2/1989 | Trimble | F16L 27/0849 138/120 |
| 5,884,901 | A |   | 3/1999 | Schilling |   |
| 6,022,328 | A | * | 2/2000 | Hailey | A61H 23/0263 601/46 |
| 7,128,352 | B1 | * | 10/2006 | Phippen | A01K 23/005 294/1.5 |
| 7,350,826 | B2 |   | 4/2008 | Cantrell et al. |   |
| 8,070,995 | B2 | * | 12/2011 | Campau et al. | E03C 1/021 138/104 |
| 2012/0014009 | A1 |   | 1/2012 | Prendamano |   |
| 2013/0118045 | A1 | * | 5/2013 | Sample et al. | G09F 21/02 40/538 |
| 2015/0292721 | A1 | * | 10/2015 | Lesmeister et al. | F21V 21/32 362/555 |

FOREIGN PATENT DOCUMENTS

DE          4239915 C1 *   1/1994   ............. F16L 55/34

* cited by examiner

*Primary Examiner* — Richard A Smith
(74) *Attorney, Agent, or Firm* — The Keys Law Firm PLLC

(57) ABSTRACT

A conduit tube bending tester for use in testing potential measurements, angles and placements of a EMT conduit to be bent prior to permanently bending the EMT conduit includes a core member defining a elongated cylindrical wire constructed of a thin metal and a tubular outer body defining an exterior coating or skin constructed of a resilient material, with the core member enclosed in the outer body. Being embodied as a wire, the core member has the ability to be bent at any point along its length in any direction through the application of external force and retain the bend unless and until it is straightened or re-bent in another direction through application of external force. The outer body may additionally include a plurality of markings which define standardized measurements.

13 Claims, 1 Drawing Sheet

CONDUIT TUBE BENDING TESTER

BACKGROUND OF THE INVENTION

Field of the Invention

This invention relates generally to conduit bending and, more particularly, to an bendable tubular apparatus enabling simulations of electrical conduit bending for testing measurements, angles and placement.

Description of the Prior Art

The design and use of conduits such as electrical metallic tubing ("EMT") conduit in electrical construction work is well established. In many installations or tasks where EMT conduits are employed, a common requirement is that the EMT conduits be bent to fit properly in a space or to run along a desired path. A problem which still exists, however, is that in the event an optimal bending of a first EMT conduit is not achieved (because of a mistake, miscalculation or other reason), it is common for the first EMT conduit to be discarded and an attempt be made to optimally bend a second EMT conduit. Such a process can become costly as a professional may go through several EMT conduits for a single targeted spot before finally bending one in the desired manner. Thus, there remains a need for a conduit tube bending tester for allowing a professional (or other user) to bend and re-bend a conduit style tubular apparatus to test for optimal measurements, angles and placement for a permanent conduit tube. It would be helpful if such a conduit tube bending tester was sized and shaped as conventional EMT tubing so as to enable a professional to test an identical structure prior to permanently bending an EMT conduit. It would be additionally desirable for such a conduit tube bending tester to include measurement markings on its exterior surface to allow for precise measurements of spaces and distances while in use.

The Applicant's invention described herein provides for a conduit tube bending tester adapted to allow a user to test potential measurements, angles and placements of a EMT conduit to be bent prior to permanently bending the EMT conduit. The primary components in Applicant's conduit tube bending tester are a bendable wire core and a resilient outer body. When in operation, the conduit tube bending tester enables more effective and efficient use of EMT conduit during conventional electrical installations. As a result, many of the limitations imposed by prior art structures are removed.

SUMMARY OF THE INVENTION

A conduit tube bending tester for use in testing potential measurements, angles and placements of a EMT conduit to be bent prior to permanently bending the EMT conduit. The conduit tube bending tester comprises a core member defining a elongated cylindrical wire constructed of a thin metal and a tubular outer body defining an exterior coating or skin constructed of a resilient material, with the core member enclosed in the outer body. Being embodied as a wire, the core member has the ability to be bent at any point along its length in any direction through the application of external force and retain the bend unless and until it is straightened or re-bent in another direction through application of external force. The outer body may additionally include a plurality of markings which define standardized measurements.

It is an object of this invention to provide a conduit tube bending tester for allowing a professional to bend and re-bend a conduit style tubular apparatus to test for optimal measurements, angles and placement for a permanent conduit tube.

It is another object of this invention to provide a conduit tube bending tester sized and shaped as conventional EMT tubing so as to enable a professional to test an identical structure prior to permanently bending an EMT conduit.

It is yet another object of this invention to provide a conduit tube bending tester which includes measurement markings on its exterior surface to allow for precise measurements of spaces and distances while in use.

These and other objects will be apparent to one of skill in the art.

DETAILED DESCRIPTION OF THE INVENTION

Figure 1:
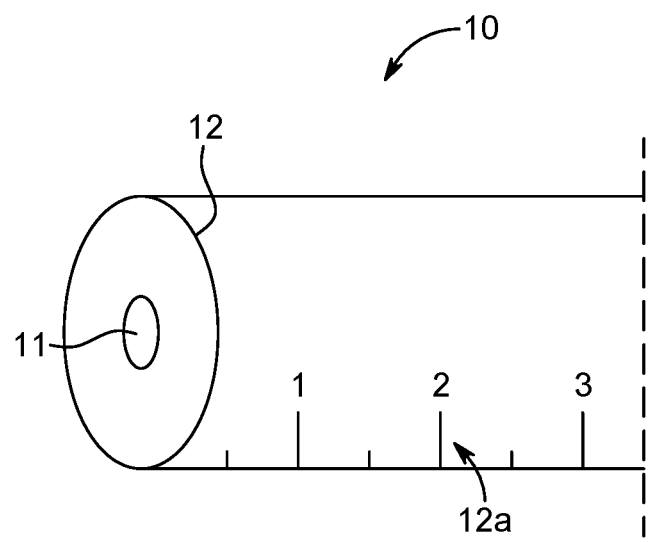
FIG. 1 is a side perspective view of a conduit tube bending tester built in accordance with the present invention.
Figure 2:
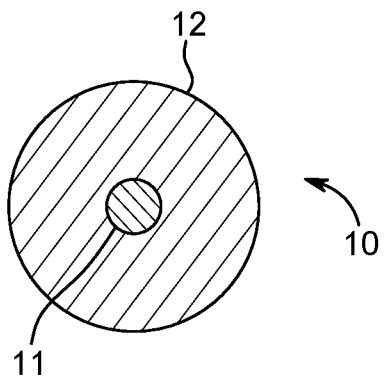
FIG. 2 is a front elevational view of a cross section of a conduit tube bending tester built in accordance with the present invention.

Referring now to the drawings and in particular FIGS. 1 and 2, a conduit tube bending tester 10 is shown having a solid core member 11 constructed of a bendable material and disposed inside of a tubular outer body 12. In the preferred embodiment, the core member 11 defines an elongated cylindrical wire constructed of a thin metal, giving it the ability to be bendable (i.e. bent at any lengthwise point in any direction through an application of external force, commonly by hand) and shape retaining (i.e. retain such a bend unless and until it is straightened or re-bent in another direction through a subsequent application of external force).

In the preferred embodiment, the outer body 12 defines an exterior coating or skin constructed of a resilient material which is positioned around the entire circumference of the core member 11. In some embodiments, the outer body 12 is constructed out of rubber or plastic. In this regard, the outer body 12, when positioned over the core member 11, adopts the bendable and shape retaining qualities.

In many embodiments, the exterior surface of the outer body 12 includes a plurality of markings 12a which define standardized measurements, thereby allowing a user to determine precise distances while using the conduit tube bending tester 10.

It is appreciated that the outer body 12 may be provided in different width sizes. In accordance with the present invention, it is contemplated that the outer body 12 may be sized so that the outer diameter of the conduit tube bending tester 10 matches one of the conventional outer diameters of EMT conduits: ½", ¾", and 1".

In an alternate embodiment, the core member defines an elongated wire having a polygonal cross section. It is contemplated that in such embodiments, the core member having a polygonal cross section may be easier to bend in the directions which correspond to the planar sides.

In another alternate embodiment, the core member defines an elongated wire having a polygonal cross section and having a helical orientation inside the outer body. It is contemplated that in such an embodiments, the core member may be thinner without sacrificing strength.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A conduit tube bending tester for testing potential measurements, angles and placements of an electrical metallic tubing conduit to be bent prior to permanently bending the electrical metallic tubing conduit comprising:
   a core member defining an elongated element;
   an outer body having a smooth, uniform exterior surface, wherein said core member is disposed in the outer body such that the core member and outer body together are adapted to be bendable and shape retaining bent at any lengthwise point in any direction through an application of external force and retain such a bend unless and until a subsequent application of external force;
   wherein the outer body is sized such that the total length of a cross section of the conduit tube bending tester is more than twice the length of a cross section of the core member; and
   wherein said exterior surface includes a plurality of markings which define standardized measurements.

2. The conduit tube bending tester of claim 1, wherein said core member is constructed of a bendable, shape retaining material and the outer body is constructed of a resilient material.

3. The conduit tube bending tester of claim 1, wherein said outer body is constructed of at least one of rubber and plastic.

4. The conduit tube bending tester of claim 1, wherein said core member is constructed of a solid material that is bendable and shape retaining.

5. The conduit tube bending tester of claim 4, wherein said core member defines an elongated cylindrical wire constructed of a thin metal.

6. The conduit tube bending tester of claim 1, wherein said core member defines an elongated wire having a polygonal cross section.

7. The conduit tube bending tester of claim 1, wherein said core member defines an elongated wire having a polygonal cross section and having a helical orientation inside the outer body.

8. A conduit tube bending tester for testing potential measurements, angles and placements of an electrical metallic tubing conduit to be bent prior to permanently bending the electrical metallic tubing conduit comprising:
   a core member defining an elongated element, wherein said core member is constructed of a solid material that is bendable and shape retaining;
   an outer body having a smooth, uniform exterior surface and constructed of a resilient material, wherein said core member is integral with the outer body such that the core member and outer body together are adapted to be bendable and shape retaining bent at any lengthwise point in any direction through an application of external force and retain such a bend unless and until a subsequent application of external force;
   wherein the outer body is sized such that the total length of a cross section of the conduit tube bending tester is more than twice the length of a cross section of the core member; and
   wherein said exterior surface includes a plurality of markings which define standardized measurements.

9. The conduit tube bending tester of claim 8, wherein said outer body is constructed of at least one of rubber and plastic.

10. The conduit tube bending tester of claim 8, wherein said core member is disposed in said outer body.

11. The conduit tube bending tester of claim 8, wherein said core member defines an elongated cylindrical wire constructed of a thin metal.

12. The conduit tube bending tester of claim 8, wherein said core member defines an elongated wire having a polygonal cross section.

13. The conduit tube bending tester of claim 8, wherein said core member defines an elongated wire having a polygonal cross section and having a helical orientation inside the outer body.

* * * * *